US006775204B2

(12) United States Patent
Scott

(10) Patent No.: US 6,775,204 B2
(45) Date of Patent: Aug. 10, 2004

(54) AUTOMATED CABLE HANDLING AND TRANSPORT APPARATUS AND VEHICLE

(75) Inventor: Gary Lee Scott, Sugar Land, TX (US)

(73) Assignee: PGS Onshore, Inc., Houston, TX (US)

( * ) Notice: Subject to any disclaimer, the term of this patent is extended or adjusted under 35 U.S.C. 154(b) by 68 days.

(21) Appl. No.: 10/148,248
(22) PCT Filed: Apr. 10, 2001
(86) PCT No.: PCT/US01/11640
§ 371 (c)(1), (2), (4) Date: Sep. 23, 2002
(87) PCT Pub. No.: WO02/29948
PCT Pub. Date: Apr. 11, 2002

(65) Prior Publication Data
US 2003/0057769 A1 Mar. 27, 2003

Related U.S. Application Data
(60) Provisional application No. 60/236,547, filed on Sep. 29, 2000.

(51) Int. Cl.[7] .................................................. G01V 1/38
(52) U.S. Cl. ........................................................ 367/17
(58) Field of Search ................................ 307/9.1, 10.1; 367/15, 17, 19, 20, 36, 37, 55

(56) References Cited
U.S. PATENT DOCUMENTS 4,756,268 A * 7/1988 Gjestrum et al. ............ 114/242
5,979,838 A * 11/1999 Romagnoli, Jr. .............. 248/62
6,021,091 A * 2/2000 Gaiser .......................... 367/20
6,459,653 B1 * 10/2002 Kuche .......................... 367/17

* cited by examiner

Primary Examiner—Matthew V. Nguyen
(74) Attorney, Agent, or Firm—E. Eugene Thigpen

(57) ABSTRACT

There is provided an apparatus and vehicle for laying seismic line cable on the ground, retrieving the cable from near the ground surface, and transporting the cable. The vehicle carries at least one cable reel for unspooling the cable therefrom when laying cable and spooling the cable thereon when retrieving the cable. When laying cable, a towed depression wheel forms a depression wheel forms a channel in the ground for laying the unspooled cable therein. The cable reel includes an electric slip ring for electrically energizing and testing the cable components while the cable is being laid. When used in very cold environments, a temperature controlled enclosure encloses the cable reel for maintaining the cable at a temperature at which it is sufficiently flexible for handling and laying. When retrieving cable, a motor power controller automatically controls the power to the cable reel drive motor for maintaining constant tension in the cable being retrieved. A cable tension measuring device provides feedback to the motor power controller. The cable being retrieved passes over a guide roller attached to the end of an arm pivotally attached to the vehicle. The arm is pivotally biased upward and away from the ground surface for tensioning the cable being retrieved. The cable also passes over a plurality of sheaves mounted on the arm or the vehicle for flexing the cable to remove any foreign material adhering to the cable being retrieved.

41 Claims, 1 Drawing Sheet

TRAVEL DIRECTION

AUTOMATED CABLE HANDLING AND TRANSPORT APPARATUS AND VEHICLE

CROSS-REFERENCE TO RELATED APPLICATIONS

This application claims the benefit of U.S. Provisional Application No. 60/236,547, filed on Sep. 29, 2000.

BACKGROUND OF THE INVENTION

1. Field of the Invention

The present invention generally relates to cable handling and, more particularly, is concerned with an apparatus and vehicle for laying seismic line cable on the ground, for retrieving the laid cable from near the ground surface, and for transporting the cable over land.

2. Description of the Prior Art

Seismic exploration for oil and gas reservoirs underlying land areas often requires the laying and later retrieval of very long lengths of seismic line cable. Geophone sensors and electronic modules are usually attached at intermittent points along the length of the cable. The components, once deployed and connected together, form a long line, or lines, of seismic sensors, with attached remote electronic monitoring packages, and a system of interconnecting cables that carry each sensors' output signals back to a seismic recording system. This attached sensitive electronic equipment requires that the seismic line cable be laid carefully. To obtain accurate seismic data, the geophone sensors attached to the cable must be placed or deployed on the ground surface in a vertical orientation, rather than tilted or sideways. When retrieving the seismic line cable from the ground after the exploration activities are completed, the cable must be held in tension to prevent the entangling of the sensors, electronic modules, and their lead wires with one another or with the seismic line cable.

Seismic exploration operations are often conducted in very harsh weather environments. For example, exploration activities in the Arctic are often performed at temperatures as low as minus 50° C. The seismic line cable becomes stiff and inflexible at such low temperatures, which makes deploying cable at such temperatures difficult.

Present methods for transporting, deploying and later retrieving, and securing for further transport, the electronics, the wired arrays of seismic sensors, and the associated seismic line cables, are manual and time consuming. The common method for transporting and deploying these items is to transport the cables piled into a basket or bin mounted on a transport vehicle. The individual packages of electronic monitoring devices are placed into small bins on the vehicle, and the strings of sensors are grouped together by hanging the sensors, and associated interconnecting wire, by passing a rod through loops attached to the sensor's interconnecting wire. The rod is often in the shape of a "safety pin." The pin closes by latching one end into a clasp on the other end. The sensors are strung onto the pin, while it is open, until all the sensors, and their associated interconnecting wires, are secured by their attached loops onto the pin. The pin is then closed. The now full pin is hung onto the vehicle from hangers attached along the sides of the transport vehicle.

During the deployment process, the appropriate number of sensor arrays on pins, electronic module packages, and interconnecting cables are dropped off the vehicle at appropriate intervals along the line. Seismic exploration crew personnel walk along behind the vehicle and position the electronic module packages, stretch out the cables between the electronic modules, unpin the array of sensors and stretch them out along side the interconnecting cable. Each sensor is then installed into the ground. The end of the wired sensor array is terminated with an electrical connector that is then connected into the electronic package.

When the recording process is complete, the crew personnel again walk along the line picking up the sensors, grouping them again back onto the pins by sliding the end of the pin through the individual loops on the sensor's wire. The seismic cable is then rolled up. All of these items are then placed back onto the vehicle to be transported to the next layout location. Hence, the present method for laying and retrieving seismic cable is slow and highly labor intensive.

Consequently, a need exists for an automated cable handling and transport apparatus and vehicle that is capable of both deploying and retrieving seismic cable having sensors and electronic modules attached intermittently along its length. Preferably, the apparatus and vehicle that meets this need can accomplish both deployment and retrieval of the cable without the constant need for personnel on the ground to assist in either action. In addition, the apparatus and vehicle will preferably be capable of maintaining a controlled amount of tension on the cable as it is being retrieved so as to prevent entangling of the cable components. Further, the apparatus and vehicle will preferably provide a means for energizing and testing the cable and its electronic components while the cable is being laid, so that mislaid or defective components can be relaid or repaired while personnel are still in their vicinity. Ideally, such an apparatus and vehicle will also provide a means for maintaining the stored cable at a temperature at which it can be easily handled and deployed.

BRIEF SUMMARY OF THE INVENTION

The present invention addresses the aforementioned needs by providing a mechanized cable laying, retrieval, and transport apparatus and vehicle. In one exemplary application, the seismic line cable includes geophone sensors and electronic modules that are interconnected by sensor interconnect lead wires.

A powered reel mounted on a vehicle is used to lay out, retrieve, and hold for transport these three components as a single unit. The result is faster deployment and retrieval of the equipment. Also, the number of personnel required to perform the lay out and retrieval process is reduced. The number of personnel exposed to stress and weather related injuries is also reduced. The present invention permits the required seismic crew personnel to ride on the vehicle for operating the controls of the power reel unit.

According to one aspect of the invention, an apparatus and vehicle is provided for retrieving a length of cable from near the ground surface and transporting the retrieved cable. The apparatus and vehicle comprises a vehicle capable of movement over land and at least one cable reel is supported by the vehicle for spooling the cable thereon as it is being retrieved from near the ground surface. Means is associated with the vehicle for tensioning the cable being retrieved.

According to another aspect of the invention, an apparatus and vehicle is provided for transporting and laying cable on the ground. The apparatus and vehicle comprises a vehicle capable of movement over land and at least one cable reel supported by the vehicle for unspooling the cable therefrom as it is being laid. Means may also be associated with the vehicle for forming a channel in the ground for laying the unspooled cable therein.

According to a third aspect of the invention, an apparatus and vehicle is provided for laying cable on the ground, for retrieving cable from near the ground surface, and for transporting the cable. The apparatus and vehicle comprises a vehicle capable of movement over land and at least one cable reel supported by the vehicle for unspooling the cable therefrom when laying cable, and for spooling the cable thereon when retrieving cable. Means may also be associated with the vehicle for forming a channel in the ground for laying the unspooled cable therein. A motor is attached to the cable reel for tensioning the cable and for rotating the reel to spool the cable thereon. An arm has a first end pivotally attached to the vehicle and a second end extending away from the vehicle. The arm is pivotally biased upward and away from the ground surface. A guide roller is rotatably attached to the second end of the arm. The cable being retrieved passes over the guide roller so that the pivotally biased arm assists in tensioning the cable being retrieved. At least one sheave is rotatably mounted on the arm. The cable being retrieved passes over the sheave for flexing the cable so as to break up and remove any foreign material adhering to the cable.

BRIEF DESCRIPTION OF THE DRAWING

For a more complete understanding of the present invention, and the advantages thereof, reference is now made to the following Detailed Description of the Invention taken in conjunction with the accompanying drawing, in which.

DETAILED DESCRIPTION OF THE INVENTION

Figure 1:
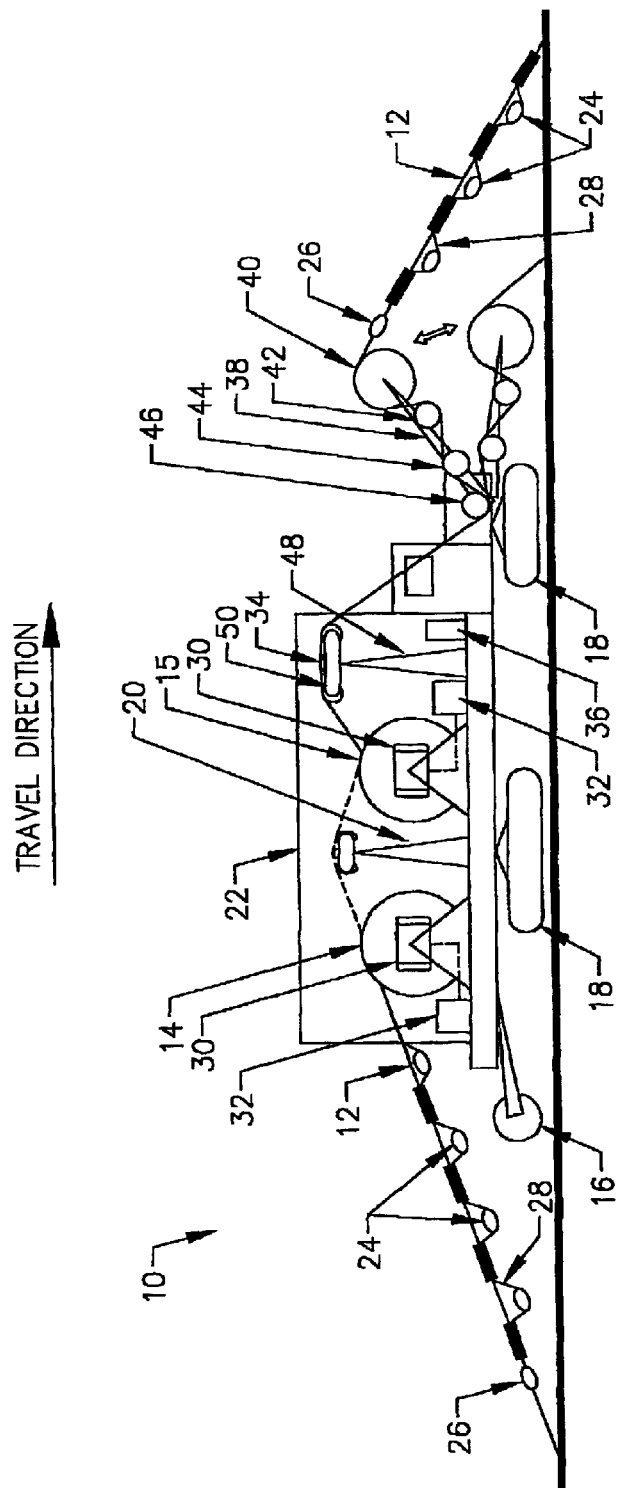
FIG. 1 is a side elevation view of the seismic cable handling and transport apparatus and vehicle of the present invention.

The preferred embodiment of the present invention and its advantages are best understood by referring to the drawing, like numerals being used for like and corresponding parts of the various drawing.

In FIG. 1, there is shown in side elevation view an apparatus and vehicle, generally designated 10, for laying or deploying seismic line cable on the earth surface, for retrieving the deployed cable from near the ground surface, and for transporting the cable. Vehicle 10 both lays and retrieves cable while traveling in the indicated direction (left to right) in FIG. 1. The seismic line cable 12 is spooled onto, unspooled from, and transported by cable reels 14 and 15 mounted on vehicle 10. Cable reels 14 and 15 are of sufficient size to store a minimum of 8000 feet (2440 meters) of seismic line cable with attached sensors and electronic modules. Cable reels 14 and 15 are detachably mounted onto vehicle 10 so that full or empty reels 14 or 15 can be easily transferred on and off vehicle 10. Additional cable reels (not illustrated) can also be mounted on vehicle 10 if desired.

When laying or deploying cable 12 on snow, sand, or soft earth, depression wheel 16 towed by vehicle 10 depresses a channel or trough in the earth covering, into which channel cable 12 is laid. Alternatively, the channel can be depressed in the soft earth covering by one of the load bearing vehicle wheels (not illustrated) or by the flexible tracks 18 on which the vehicle rides. When laying cable 12 on hard soil, the channel for laying cable 12 therein can be formed by a single blade plow (not shown) towed by vehicle 10.

Cable guide and standoff 20 is mounted on vehicle 10 between cable reels 14 and 15. When cable 12 is being laid from cable reel 15, cable guide and standoff 20 guides cable 12 so that the path of cable 12 is unobstructed by cable reel 14 or other apparatus on vehicle 10, and so that cable 12 follows the desired path to the ground.

When used to lay cable in very cold environments, enclosure 22 is mounted on vehicle 10 to enclose cable reels 14 and 15. Enclosure 22 is insulated and temperature controlled to maintain spooled cable 12 at a temperature at which it is sufficiently flexible for handling and laying. Cable 12 should preferably be maintained at a temperature of not less than minus 10° C. and below the melt point of water (0° C.).

In one exemplary application, seismic line cable 12 includes geophone sensors 24 and electronic modules 26 that are interconnected by sensor interconnect lead wires 28. Between each pair of sensors 24 and between each electronic module 26 and adjacent sensor 24, lead wire 28 is taped or otherwise fastened to cable 12. In other applications to which the present invention is applicable, seismic line cable 12 may include other or different components than these. To obtain accurate seismic data in seismic exploration using geophone sensors, it is essential that the sensors be deployed in a vertical orientation and not tilted, sideways, or upside down. As seen in FIG. 1, there is sufficient slack in lead wire 28 to permit sensors 24 to hang freely below cable 12 as cable 12 is being laid. Thus, because sensors 24 hang from cable 12 with their bottoms down and tops up, sensors 24 are correctly deployed in a vertical orientation as cable 12 is laid in the channel formed in the earth surface.

Cable reels 14 and 15 contain an electrically conductive slip ring (not illustrated) so that cable 12 and its electronic modules 26 and sensors 24 can be continuously powered and tested as cable 12 is being deployed. The slip ring preferably contains 4 or 6 conductors. For example, the SERCEL "tilt" test can be applied to each sensor 24 after it has been deployed to determine whether it is oriented vertically or is tilted from the vertical. If the tilt test reveals that a sensor is improperly deployed, corrective action can be taken while personnel are still near the misplaced sensor.

Apparatus and vehicle 10 is also equipped for retrieving a length of cable 12 from near the ground surface and transporting the retrieved cable 12. Cable 12 is retrieved from the front end of vehicle 10, and may be spooled on either cable reel 14 or reel 15 as it is retrieved. If cable 12 is being spooled onto reel 14, cable 12 is guided by cable guide and standoff 20 so that the path of cable 12 (indicated by dotted lines in FIG. 1) is unobstructed by cable reel 15 or other apparatus on vehicle 10.

Cable reels 14 and 15 are equipped with drive motors 30 for rotating reels 14 and 15 to spool cable 12 thereon and for tensioning the unspooled cable being retrieved. Drive motors 30 may be electric or hydraulic. A motor power controller 32 is connected to each motor 30 for automatically controlling the motor power so that a constant, operator selectable tension is maintained in cable 12 as it is being retrieved. If sufficient tension is not maintained and cable 12 becomes slack as it is being retrieved, the geophone sensors 24 and electronic modules 26 can become entangled with each other or with lead wires 28 as cable 12 is being spooled, or when later unspooled and deployed. A cable tension measuring device 34 measures the tension in cable 12 as it is being retrieved and provides appropriate feedback to motor power controller 32. Cable tension measuring device 34 may be a running line tensionometer, for example.

The cable tension measuring device 34 also provides a measured cable tension signal to vehicle drive control system 36. When the tension in cable 12 being retrieved reaches a predetermined value, vehicle drive control system 36 automatically slows the drive speed of vehicle 10 until the cable tension drops sufficiently to resume normal vehicle speed. When the tension in cable 12 reaches a second and higher predetermined value, vehicle drive control system 36 automatically stops the forward motion of vehicle 10. Personnel may then deboard vehicle 10 to determine and correct the cause of excessive cable tension, such as, for example, a cable stuck in ice. After the cable has been freed, automated retrieval of cable 12 may be resumed.

As an alternative to automatic control, drive motors 30 may be manually controlled by the operator of apparatus and vehicle 10. In this case, the operator may control either the power to the drive motor 30 or the rotational speed of cable reel 14 or 15 so as to maintain constant tension in cable 12 being retrieved. Apparatus and vehicle 10 may also be equipped so that the operator can control the drive motors either automatically or manually, depending on the terrain he is covering.

As a further means for tensioning cable 12 as it is being retrieved, apparatus and vehicle 10 is equipped with arm 38 having guide roller or pulley 40 on its outer end. The opposite end of arm 38 from guide roller 40 is pivotally attached to the lower front portion of vehicle 10. Arm 38 is pivotally biased or urged upward, away from the ground surface, by one or more mechanical springs or hydraulic or pneumatic cylinders (not shown) attached to arm 38. Guide roller 40 has a sufficiently large diameter to permit the maximum expected tension to be applied to cable 12 without causing damage to cable 12. This permits a cable that has become stuck in ice to be pulled free by apparatus 10 without manual removal from the ice, and without damage to the cable.

Cable 12 being retrieved by apparatus and vehicle 12 passes first over guide roller 40 and then around rotatable sheaves 42, 44, and 46. From lowermost sheave 46 cable 12 passes back up and over cable guide and standoff 48, and then to a cable reel 15 or 14. As seen in FIG. 1, pivotally biased arm 38 tensions cable 12 as it is being retrieved from the ground, and the tension in cable 12 resists the upward pivotal motion of arm 38 that is urged by the spring or fluid cylinder (not shown) attached to arm 38. As the tension in cable 12 increases, the cable tension force pulls arm 38 down toward the ground to the position shown in dotted lines in FIG. 1. As the cable tension decreases, the spring or fluid cylinder attached to arm 38 pivots arm 38 back up to the position shown in solid lines in FIG. 1. The position of arm 38 thus provides a visual indication to the vehicle operator of the amount of tension in cable 12 as it is being retrieved. This visual indication assists the operator in efficiently retrieving the cable, particularly when the operator manually controls the retrieval rate. The position of arm 38 can also be used to monitor the cable tension for providing the tension signal to vehicle drive control system 36 for slowing and for stopping vehicle 10 at predetermined levels of cable tension, as described above.

As cable 12 passes over sheaves 42, 44, and 46, it is flexed in opposite directions so as to break up and remove any foreign material, such as accumulated ice or dirt, from cable 12. The centers of sheaves 42 and 46 are offset from the center line of arm 38 so as to increase the degree of wrap, and of flex, of cable 12, and thus to facilitate removal of foreign material from cable 12 as it is being retrieved.

A level wind mechanism 50 is built into the top of cable guide and standoff 48 for distributing the cable wind uniformly across the width of cable reel 14 or 15 as cable 12 is being spooled thereon. Cable wind mechanisms suitable for this application are commercially available to the industry.

Apparatus and vehicle 10 should be designed with as low a center of gravity as possible to permit vehicle 10 to be operated over hilly or mountainous terrain without overturning.

The automated cable handling and transport apparatus and vehicle of the present invention, and many of its intended advantages, will be understood from the foregoing description of an example embodiment, and it will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the form hereinbefore described being exemplary embodiment thereof.

I claim:

1. An apparatus and vehicle for retrieving a length of cable from near the ground surface and transporting the retrieved cable, which comprises:
   - a vehicle capable of movement over land;
   - at least one cable reel supported by the vehicle for spooling the cable thereon as it is being retrieved from near the ground surface; and
   - means associated with the vehicle for tensioning the cable being retrieved.

2. The apparatus and vehicle of claim 1, wherein the means for tensioning the cable being retrieved comprises a drive motor attached to the cable reel for rotating the reel to spool the cable thereon and for tensioning the unspooled cable being retrieved.

3. The apparatus and vehicle of claim 2, wherein the motor power is manually controlled for maintaining constant tension in the cable being retrieved.

4. The apparatus and vehicle of claim 2, wherein the rotational speed of the reel is manually controlled for maintaining constant tension in the cable being retrieved.

5. The apparatus and vehicle of claim 2, wherein the motor power is automatically controlled by a motor power controller connected to the motor for maintaining constant tension in the cable being retrieved.

6. The apparatus and vehicle of claim 5, further including a cable tension measuring device associated with the cable for measuring the tension in the cable being retrieved and for providing feedback to the motor power controller.

7. The apparatus and vehicle of claim 5, further including:
   - means for measuring the tension in the cable being retrieved; and
   - means responsive to the measured cable tension for automatically slowing the speed of the vehicle when the cable tension reaches a predetermined value, and for automatically stopping the vehicle when the cable tension reaches a second and higher predetermined value.

8. The apparatus and vehicle of claim 7, wherein the means for measuring the cable tension comprises a running line tensionometer.

9. The apparatus and vehicle of claim 7, wherein the means responsive to the measured cable tension for automatically slowing and for automatically stopping the vehicle comprises a vehicle drive control system.

10. The apparatus and vehicle of claim 1, wherein the means for tensioning the cable being retrieved comprises:
    - an arm having a first end pivotally attached to the vehicle and a second end extending away from the vehicle, the arm being pivotally biased upward and away from the ground surface;

a guide roller rotatably attached to the second end of the arm, the cable being retrieved passing over the guide roller so that the pivotally biased arm tensions the cable being retrieved.

11. The apparatus and vehicle of claim 10, further including means for removing any foreign material adhering to the cable.

12. The apparatus and vehicle of claim 11, wherein the means for removing foreign material adhering to the cable comprises at least one sheave rotatably mounted on the arm, the cable being retrieved passing over the sheave for flexing the cable so as to break up and remove the foreign material from the cable.

13. The apparatus and vehicle of claim 12, wherein a plurality of the sheaves are rotatably mounted on the arm, and wherein the center of at least one of the sheaves is offset from the center line of the arm so as to flex the cable passing over the sheaves in opposite directions, for facilitating removal of foreign material adhering to the cable.

14. The apparatus and vehicle of claim 10, wherein the arm is pivotally biased upward by at least one mechanical spring attached to the arm.

15. The apparatus and vehicle of claim 10, wherein the arm is pivotally biased upward by at least one hydraulic cylinder attached to the arm.

16. The apparatus and vehicle of claim 10, wherein the arm is pivotally biased upward by at least one pneumatic cylinder attached to the arm.

17. The apparatus and vehicle of claim 1, wherein at least two cable reels are mounted on the vehicle, and further including at least one cable guide and standoff mounted on the vehicle for guiding the cable being retrieved past one or more of the reels and to another one of the reels for providing an unobstructed path for spooling the cable thereon.

18. The apparatus and vehicle of claim 1, further including a level wind mechanism mounted on the vehicle proximate the cable reel for distributing the cable wind uniformly across the width of the reel as the cable is being spooled thereon.

19. The apparatus and vehicle of claim 1, wherein the cable reel is detachable from the vehicle for removal therefrom.

20. An apparatus and vehicle for transporting and laying cable on the ground, which comprises:

a vehicle capable of movement over land;

at least one cable reel supported by the vehicle for unspooling the cable therefrom as it is being laid; and means associated with the vehicle for forming a channel in the ground for laying the unspooled cable therein.

21. The apparatus and vehicle of claim 20, wherein the means for forming a channel in the ground comprises a depression wheel towed by the vehicle.

22. The apparatus and vehicle of claim 20, wherein the means for forming a channel in the ground comprises a plow towed by the vehicle.

23. The apparatus and vehicle of claim 20, wherein the vehicle is supported and transported by a plurality of load bearing vehicle wheels, and wherein the means for forming a channel in the ground comprises one or more of the load bearing wheels of the vehicle.

24. The apparatus and vehicle of claim 20, wherein the vehicle is supported and transported by a plurality of flexible tracks, and wherein the means for forming a channel in the ground comprises one or more of the flexible tracks of the vehicle.

25. The apparatus and vehicle of claim 20, wherein the cable comprises electrically conducting seismic line cable, and further including a slip ring associated with the cable reel for electrically energizing and testing the cable components while the cable is being laid.

26. The apparatus and vehicle of claim 25, wherein the seismic line cable further includes a plurality of sensors loosely attached to the cable, and wherein the cable component testing includes a tilt test of each deployed sensor.

27. The apparatus and vehicle of claim 20, further including a temperature controlled enclosure mounted on the vehicle and enclosing the cable reel for maintaining the cable at a temperature at which it is sufficiently flexible for handling and laying.

28. The apparatus and vehicle of claim 27, wherein the spooled cable is maintained at a temperature of at least minus 10° C. but less than 0° C. by the temperature controlled enclosure.

29. The apparatus and vehicle of claim 20, wherein at least two cable reels are mounted on the vehicle, and further including at least one cable guide and standoff mounted on the vehicle for guiding the cable being laid from the reel being unspooled from and past another one or more of the reels mounted on the vehicle for providing an unobstructed path for the cable being laid.

30. The apparatus and vehicle of claim 20, wherein the cable reel is detachable from the vehicle for removal therefrom.

31. An apparatus and vehicle for laying cable on the ground, retrieving cable from near the ground surface, and transporting the cable, which comprises:

a vehicle capable of movement over land;

at least one cable reel supported by the vehicle for unspooling the cable therefrom when laying cable and for spooling the cable thereon when retrieving cable;

means associated with the vehicle for forming a channel in the ground for laying the unspooled cable therein;

a drive motor attached to the cable reel for rotating the reel to spool the cable thereon;

an arm having a first end pivotally attached to the vehicle and a second end extending away from the vehicle, the arm being pivotally biased upward and away from the ground surface;

a guide roller rotatably attached to the second end of the arm, the cable being retrieved passing over the guide roller so that the pivotally biased arm tensions the cable being retrieved; and at least one sheave rotatably mounted on the arm, the cable being retrieved passing over the sheave for flexing the cable so as to break up and remove any foreign material adhering to the cable.

32. The apparatus and vehicle of claim 31, wherein the means for forming a channel in the ground comprises a device selected from the group consisting of a depression wheel towed by the vehicle, a plow towed by the vehicle, a load bearing vehicle wheel, and a flexible vehicle track.

33. The apparatus and vehicle of claim 31, further including:

a motor power controller connected to the motor for automatically controlling the motor power so as to maintain constant tension in the cable being retrieved; and a cable tension measuring device associated with the cable for measuring the tension in the cable being retrieved and for providing feedback to the motor power controller.

34. The apparatus and vehicle of claim 31, further including:
- a running line tensionometer for measuring the tension in the cable being retrieved; and
- a vehicle control system responsive to the measured cable tension for automatically slowing the speed of the vehicle when the cable tension reaches a predetermined value, and for automatically stopping the vehicle when the cable tension reaches a second and higher predetermined value.

35. The apparatus and vehicle of claim 31, wherein a plurality of the sheaves are rotatably mounted on the arm, and wherein the center of at least one of the sheaves is offset from the center line of the arm so as to flex the cable passing over the sheaves in opposite directions, for facilitating removal of foreign material adhering to the cable.

36. The apparatus and vehicle of claim 31, wherein the arm is pivotally biased upward by a device selected from a group consisting of a mechanical spring, a hydraulic cylinder, and a pneumatic cylinder.

37. The apparatus and vehicle of claim 31, wherein at least two cable reels are mounted on the vehicle, and further including at least one cable guide and standoff mounted on the vehicle for guiding the cable past one or more of the reels and to another one of the reels for providing an unobstructed path for handling the cable.

38. The apparatus and vehicle of claim 31, further including a level wind mechanism mounted on the vehicle proximate the cable reel for distributing the cable wind uniformly across the width of the reel as the cable is being spooled thereon.

39. The apparatus and vehicle of claim 31, wherein the cable comprises electrically conducting seismic line cable, and further including a slip ring associated with the cable reel for electrically energizing and testing the cable components while the cable is being laid.

40. The apparatus and vehicle of claim 31, further including a temperature controlled enclosure mounted on the vehicle and enclosing the cable reel for maintaining the cable at a temperature at which it is sufficiently flexible for handling and laying, wherein the spooled cable is maintained at a temperature of at least minus 10° C. but less than 0° C. by the temperature controlled enclosure.

41. The apparatus and vehicle of claim 31, wherein the cable reel is detachable from the vehicle for removal therefrom.

* * * * *